United States Patent
Park et al.

(10) Patent No.: US 8,432,626 B2
(45) Date of Patent: Apr. 30, 2013

(54) OPTICAL DEVICE INCLUDING ADJUSTABLE OPTICAL ELEMENT

(75) Inventors: Chi-young Park, Suwon-si (KR);
Kwang-seok Byon, Yongin-si (KR);
Jung-soo Kim, Suwon-si (KR);
Jin-young Bang, Yongin-si (KR);
Young-jae Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/192,727

(22) Filed: Jul. 28, 2011

(65) Prior Publication Data

US 2012/0105960 A1  May 3, 2012

(30) Foreign Application Priority Data

Oct. 28, 2010  (KR) .................. 10-2010-0106027

(51) Int. Cl.
*G02B 7/02*  (2006.01)

(52) U.S. Cl.
USPC .......................................... 359/814; 359/824

(58) Field of Classification Search .......... 359/694–704, 359/811–830
See application file for complete search history.

(56) References Cited

U.S. PATENT DOCUMENTS

| 5,835,799 A | 11/1998 | Washisu |
| 5,847,887 A * | 12/1998 | Ogura et al. .................. 359/822 |
| 7,990,631 B2 * | 8/2011 | Sue et al. ..................... 359/819 |
| 2007/0024829 A1 * | 2/2007 | Mizuno ........................... 355/18 |

FOREIGN PATENT DOCUMENTS

KR  1020090124708 A  12/2009

\* cited by examiner

*Primary Examiner* — Mohammed Hasan (74) *Attorney, Agent, or Firm* — Drinker Biddle & Reath LLP (57) ABSTRACT

An optical device includes an optical element through which light is transmitted, a frame that supports the optical element, magnets in the frame around the optical element, a base unit that movably supports the frame, a cover unit to cover the magnets, and magnetic force generating units in the cover unit in positions corresponding to the magnets and that generate magnetic force when an electrical signal is applied.

11 Claims, 5 Drawing Sheets

OPTICAL DEVICE INCLUDING ADJUSTABLE OPTICAL ELEMENT

CROSS-REFERENCE TO RELATED PATENT APPLICATION

This application claims the priority benefit of Korean Patent Application No. 10-2010-0106027, filed on Oct. 28, 2010, in the Korean Intellectual Property Office, the entire disclosure of which is incorporated herein by reference.

BACKGROUND

1. Field of the Invention

Embodiments relate to optical devices, and more particularly, to optical devices having a function of correcting a hand shake by adjusting a position of an optical element.

2. Description of the Related Art

Digital cameras store images of a subject as photographic images or moving images in a digital format. Examples of such digital cameras are a digital still camera (DSC), a digital video camera (DVC), and a digital camera module mounted in mobile phones.

Optical devices may be used in the digital cameras, and for example, may adjust a light path using an optical element such as a lens or an optical filter. The optical devices also focus light for an image pickup operation to form an image.

Recently, as various digital image capturing apparatuses, such as a DSC and/or a DVC are supplied, consumers are increasingly demanding higher quality still images and/or moving images. In particular, in order to prevent decrease in clarity of images due to shaking from a hand of a user, demand for optical devices having a hand shake correction function is increasing.

SUMMARY

One or more embodiments can provide optical devices having a hand shake correction function.

One or more embodiments can provide optical devices capable of moving an optical element using a compact structure.

One or more embodiments can provide optical devices capable of operating with precision by minimizing instrumental error that may occur when components of the optical devices are assembled.

According to an embodiment, there is provided an optical device. The optical device includes an optical element through which light is transmitted, a frame for supporting the optical element, a plurality of magnets disposed in the frame around the optical element, a base unit for movably supporting the frame, a cover unit disposed to cover the plurality of magnets, and a plurality of magnetic force generating units disposed in the cover unit in positions corresponding to the plurality of magnets, and for generating magnetic force when an electrical signal is applied.

At least one of the plurality of magnetic force generating units may include a fine pattern coil formed by stacking a plurality of insulating layers, and each of the plurality of insulating layers has a surface on which a conductive pattern is formed The cover unit may include a plurality of groove portions, and the plurality of magnetic force generating units may be inserted into the plurality of groove portions.

The frame may be movably supported relative to the base unit by a plurality of ball bearings disposed between the frame and the base unit.

The frame may be slidably mated to the base unit using a straight guide.

The optical device may further include a plurality of iron plates in the base unit disposed in positions corresponding to the plurality of magnets.

The optical device may further include at least one sensor that senses a position of the frame with respect to the base unit.

The base unit may include a through hole in a position corresponding to the optical element.

The optical device may further include an imaging device that is mated to the base unit, that is located in the through hole, and that converts light transmitted through the optical element into an electrical signal.

The cover unit may be mated to the base unit using at least one coupling unit, and the base unit may include a screw groove to which the coupling unit is screw-coupled. A distance between the cover unit and the base unit may be adjusted by adjusting the screw-coupling of the at least one coupling unit and the screw groove.

The cover unit may include a plurality of insulating layers, and the plurality of magnetic force generating units may include a plurality of conductive layers. Each of the plurality of conductive layers may be on a surface of each of the plurality of insulating layers so as to correspond to the plurality of magnets.

BRIEF DESCRIPTION OF THE DRAWINGS

The above and other features and advantages will become more apparent by describing in detail exemplary embodiments with reference to the attached drawings in which.

DETAILED DESCRIPTION

Embodiments are described more fully with reference to the accompanying drawings, in which exemplary embodiments are shown.

Figure 1:
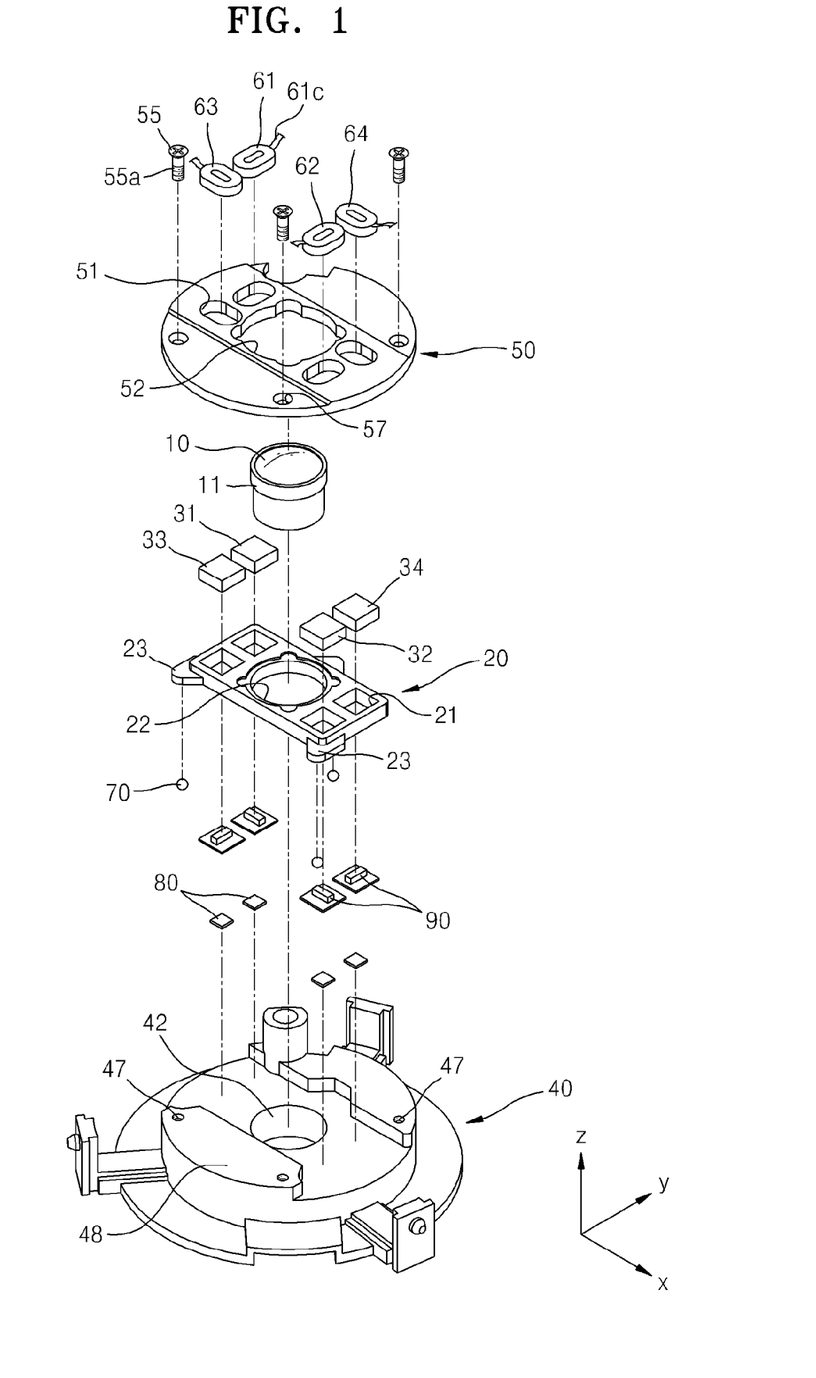
FIG. 1 is a disassembled perspective view illustrating components of an optical device according to an embodiment.
Figure 2:
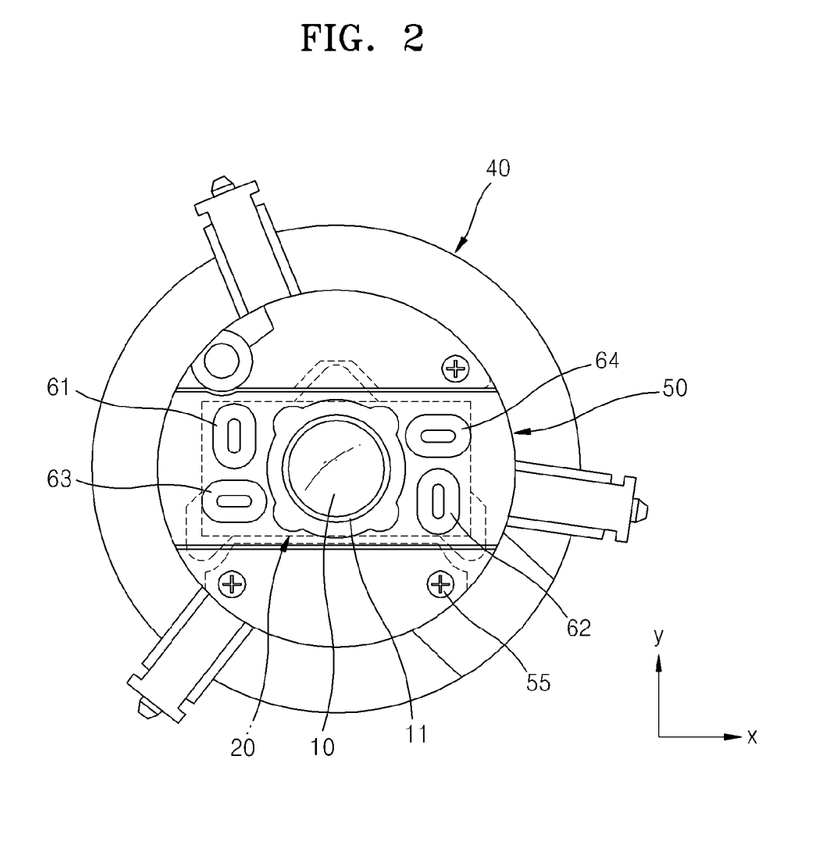
FIG. 2 is a plan view illustrating an assembled state of the optical device of FIG. 1.

FIG. 1 is a disassembled perspective view illustrating components of an optical device according to an embodiment, and FIG. 2 is a plan view illustrating an assembled state of the optical device of FIG. 1.

The optical device illustrated in FIGS. 1 and 2 can include an optical element 10 through which light can be transmitted; a frame 20 that can support the optical element 10 and can include a plurality of magnets 31, 32, 33, and 34; a base unit 40 that can movably support the frame 20; a cover unit 50 that can be disposed to cover the magnets 31, 32, 33, and 34; and a plurality of magnetic force generating units 61, 62, 63, and 64 that can be disposed in the cover unit 50 and that can generate magnetic force.

The optical element 10 can transmit light. For example, the optical element 10 may be formed of one lens or a lens assembly including a plurality of lenses and a filter.

The optical element 10 can include a support body 11 as an outer boundary thereof to be coupled to a through hole 22 of the frame 20.

The plurality of magnets 31, 32, 33, and 34 can be disposed in the frame 20. The magnets 31, 32, 33, and 34 can be inserted into mounting grooves 21 of the frame 20 formed around the through hole 22 and thus may be disposed around the optical element 10.

The base unit 40 can movably support the frame 20. That is, the frame 20 may move along a first axis (X-axis) crossing an optical axis (Z-axis) through which the optical element 10 may pass and a second axis (Y-axis) crossing the optical axis and the first axis. Since the frame 20 can support the optical element 10, the optical element 10 may move relative to the base unit 40.

In the optical device illustrated in FIGS. 1 and 2, a plurality of ball bearings 70 can be disposed between the frame 20 and the base unit 40. The ball bearings 70 can movably support the frame 20 with respect to the base unit 40. The ball bearings 70 can movably support a bearing support portion 23 that can protrude from an outer boundary of the frame 20 with respect to the base unit 40.

However, embodiments are not limited to the ball bearings 70. Alternatively, the frame 20 may be movably mounted to the base unit 40 through using other mechanical elements or electronic elements.

Thus, when images that are obtained from an imaging device (not shown) are not clear due to a shake or a shaking, such as a hand shake, the shake may be corrected by moving the optical element 10 so that the obtained images may become clear.

The optical device can be disposed on the optical axis of a barrel including a plurality of lenses, and may be disposed between the lenses. When unclear images are obtained due to a shake such as a hand shake, the optical device may be moved across the optical axis to correct the shake.

The base unit 40 can include a through hole 42 in a position corresponding to the optical element 10. Light that has transmitted through the optical element 10 can be transmitted through the through hole 42 to the outside.

The cover unit 50 can be disposed to cover the magnets 31, 32, 33, and 34. The cover unit 50 can be coupled to a wall portion 48 that can protrude from the base unit 40 and can protrude around the frame 20 to cover the magnets 31, 32, 33, and 34.

A plurality of screw grooves 47 can be formed in the wall portion 48, and holes 57 can be formed in the cover unit 50 in positions respectively corresponding to the screw grooves 47. The cover unit 50 can be coupled to the base unit 40 by screw-coupling a coupling unit 55 to the screw grooves 47 through the holes 57. A screw surface 55a can be formed on an outer portion of the coupling unit 55. A distance between the cover unit 50 and the base unit 40 may be adjusted by adjusting a depth at which the coupling unit 55 is screw-coupled to the screw groove 47 of the base unit 40.

Accordingly, by adjusting the plurality of coupling units 55 illustrated in FIG. 2, a tilting operation that can adjust the optical axis of the optical element 10 may be performed. Also, a distance between the magnetic force generating units 61, 62, 63, and 64 and the magnets 31, 32, 33, and 34 may be adjusted by adjusting the coupling units 55, and thus an intensity of magnetic force may be adjusted.

Groove portions 51 can be respectively formed in the cover unit 50 in positions corresponding to the magnets 31, 32, 33, and 34. In the groove portions 51, the magnetic force generating units 61, 62, 63, and 64 can be respectively inserted. When an electrical signal is applied from the outside, the magnetic force generating units 61, 62, 63, and 64 may generate magnetic force. An electrical signal from the outside may be applied to each of the magnetic force generating units 61, 62, 63, and 64 via a printed circuit board 61c.

The magnetic force generating units 61, 62, 63, and 64 can correspond to the magnets 31, 32, 33, and 34, respectively, and can generate magnetic force to generate driving force for moving the frame 20.

The cover unit 50 may be formed of, for example, an insulating plastic material or a metal. The cover unit 50 can include a through hole 52 corresponding to the optical element 10. Through the through hole 52 of the cover unit 50, light may be incident on the optical element 10 from the outside.

Among the magnetic force generating units 61, 62, 63, and 64, a first group including the magnetic force generating units 61 and 62 may generate magnetic force so as to move the frame 20 in an X-axis direction, and a second group including the magnetic force generating units 63 and 64 may generate magnetic force so as to move the frame 20 in an Y-axis direction.

A plurality of iron plates 80 can be installed in the base unit 40 in positions respectively corresponding to the magnets 31, 32, 33, and 34. Magnetic force can act between the iron plates 80 and the magnets 31, 32, 33, and 34. If no electrical signal is applied to the magnetic force generating units 61, 62, 63, and 64 and the magnetic force generating units 61, 62, 63, and 64 does not generate magnetic force, the frame 20 may return to an original position in a first assembled state by the magnetic force acting between the iron plates 80 and the magnets 31, 32, 33, and 34.

Also, a plurality of sensors 90 for sensing the magnets 31, 32, 33, and 34 may be disposed in the base unit 40. The sensors 90 of FIGS. 1 and 2 may be, for example, hall sensors that operate using the principle that an induced current (or voltage) changes according to intensity of magnetic field.

Embodiments are not limited to the sensors 90 that can sense the magnets 31, 32, 33, and 34 in order to sense movement of the frame 20, but various types of sensors that can sense movement of the frame 20 may be implemented. For example, a protrusion plate for sensors may be installed in the frame 20, and an optical sensor capable of sensing the protrusion plate, such as a photo interrupt sensor, may be installed on the base unit 40.

Figure 3:
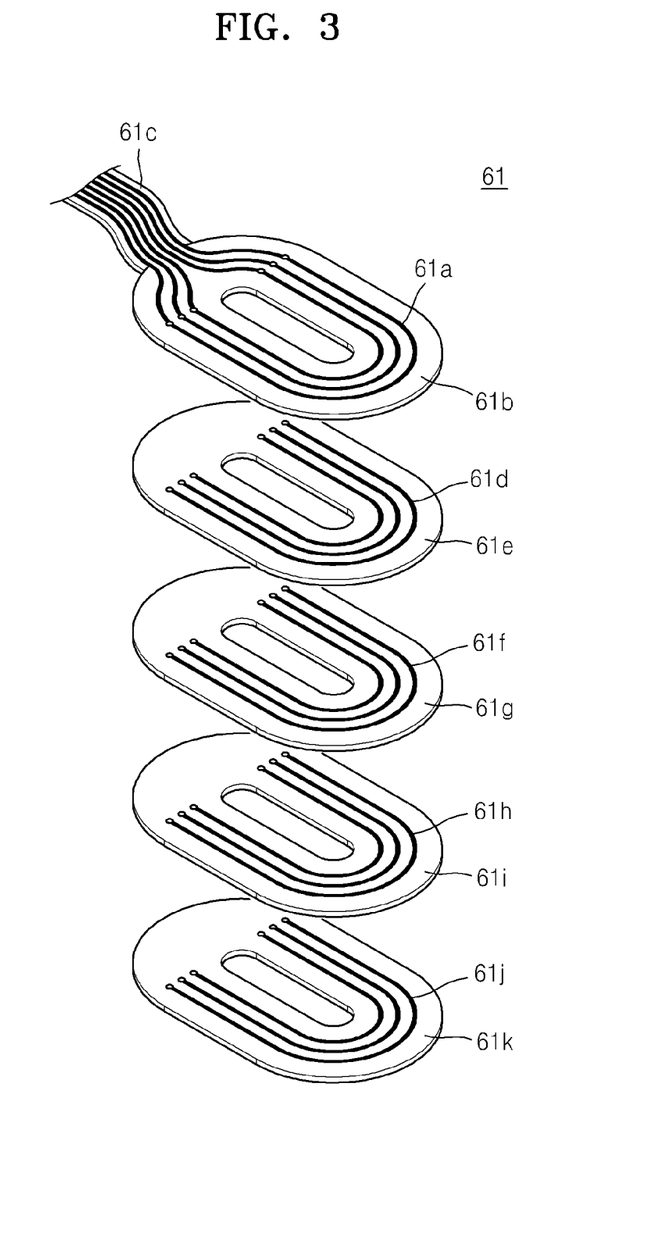
FIG. 3 is a disassembled perspective view illustrating a structure of a magnetic force generating unit included in the optical device of FIG. 1, according to an embodiment.

FIG. 3 is a disassembled perspective view illustrating a structure of the magnetic force generating unit 61 included in the optical device of FIG. 1, according to an embodiment.

The magnetic force generating unit 61 illustrated in FIG. 3 can include a plurality of insulating layers 61b, 61e, 61g, 61i, and 61k. A plurality of conductive patterns 61a, 61d, 61f, 61h, and 61j can be respectively formed on surfaces of the insulating layers 61b, 61e, 61g, 61i, and 61k. The conductive patterns 61a, 61d, 61f, 61h, and 61j can function as coils that can generate a magnetic field when a current is applied from the outside via the printed circuit board 61c.

In the conventional art, in which coils that are manufactured by repeatedly winding conductive wires and that are to be used to generate magnetic force against the magnets 31, 32, 33, 34, the sizes of the coils and the number of magnets are relatively great. However, when the magnetic force generating unit 61 is a structure of fine pattern coils formed by stacking the plurality of insulating layers 61b, 61e, 61g, 61i, and 61k, on surfaces on which the conductive patterns 61a, 61d, 61f, 61h, and 61j are formed, as illustrated in FIG. 3, a magnetic force generating unit 61 having a relatively small thickness and capable of generating sufficient magnetic force may be implemented.

Also, the magnetic force generating unit 61 formed using the fine pattern coils may provide a planar external surface. When a winding type coil according to the conventional art, in which conductive wires are repeatedly wound, is used, an external surface of the coil is uneven. However, the magnetic force generating unit 61 having a relatively small thickness and a planar external surface according to an embodiment may be easily buried in the cover unit 50. Consequently, the total size of the optical device may be remarkably reduced.

In addition, generally, hall sensors can be disposed in a cover that can cover magnets in a conventional optical device. Then the positions of the hall sensors may be changed due to mechanical error occurring when assembling the optical device, and thus, the positions of the hall sensors cannot be precisely detected.

However, in the optical device illustrated in FIGS. 1 through 3, the magnetic force generating units 61, 62, 63, and 64 can be installed in the cover unit 50, and thus, the base unit 40 may have more spare space accordingly. In other words, when the sensors 90 are first installed in the base unit 40 and then the frame 20 and the cover unit 50 are assembled, the positions at which the sensors 90 are installed can be precisely maintained, thereby improving detection precision of the sensors 90.

However, the magnetic force generating units 61, 62, 63, and 64 are not limited to the fine pattern coils and, for example, other typical coils or voice coil motors may be formed as the magnetic force generating units 61, 62, 63, and 64.

Figure 4:
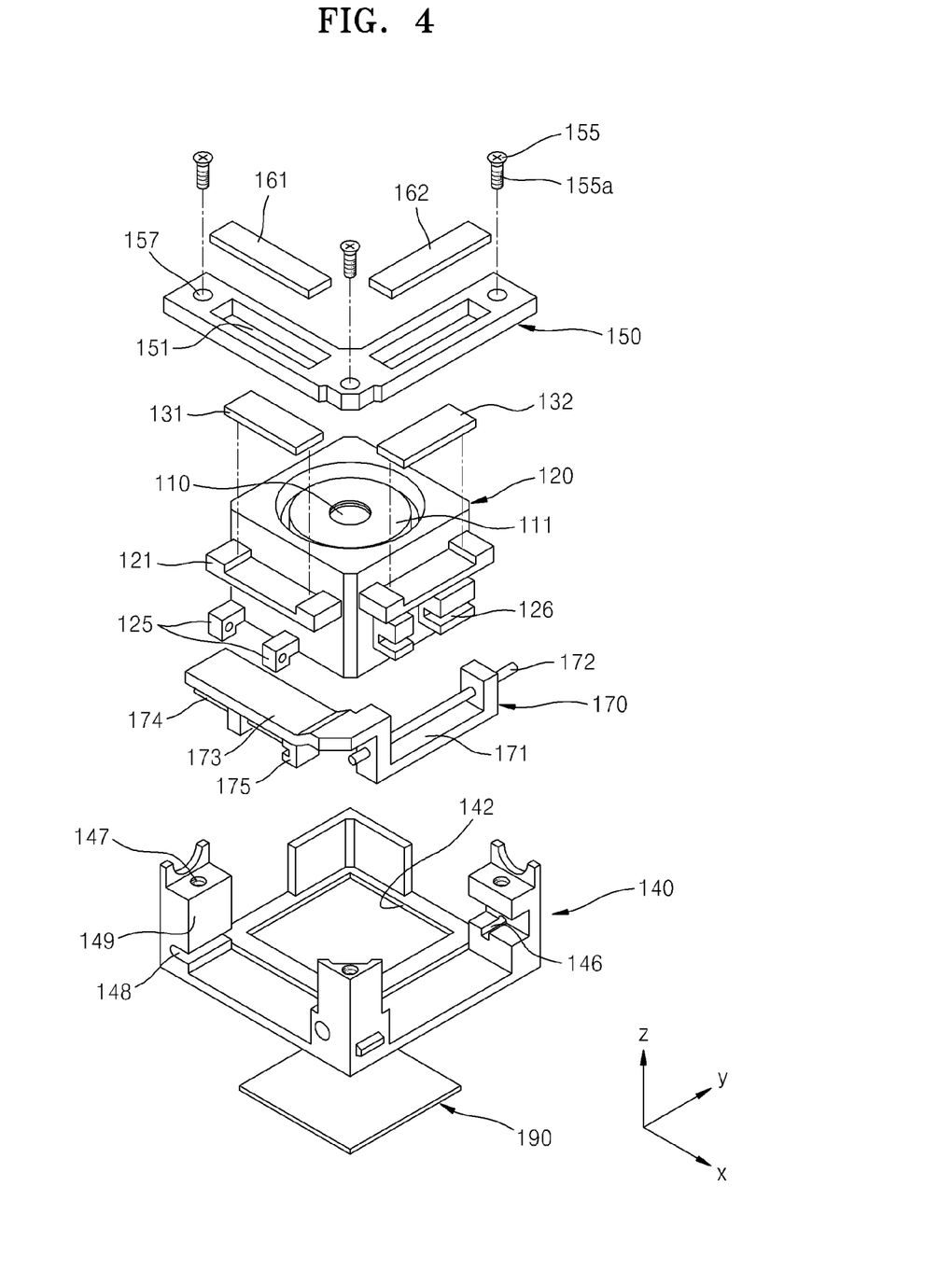
FIG. 4 is a disassembled perspective view illustrating components of an optical device according to another embodiment.

FIG. 4 is a disassembled perspective view illustrating components of an optical device according to another embodiment.

The optical device illustrated in FIG. 4 can include an optical element 110 through which light is transmitted, a frame 120 that can support the optical element 110 and can include magnets 131 and 132, a base unit 140 that can movably support the frame 120, a cover unit 150 that can be disposed to cover the magnets 131 and 132, and magnetic force generating units 161 and 162 that can be disposed in the cover unit 150 and that can generate magnetic force.

The optical element 110 can include a support body 111 as an outer boundary thereof to be coupled to the frame 120.

A supporting threshold 121 in which the plurality of magnets 131 and 132 can be mounted can be formed at an outer portion of the frame 120. Accordingly, the magnets 131 and 132 can be disposed around the optical element 110.

The frame 120 can include a sliding guide 170 so as to be slidably mounted to the base unit 140. A first guide 172 can be coupled to a first support portion 171, and a second guide 174 slidable along a sliding groove 175 along a Y-axis can be coupled to a second support portion 173.

The first guide 172 can be inserted into a support groove 146 of the base unit 140. Two end portions of the second guide 174 can be movably supported by a sliding groove 148 of the base unit 140 and the sliding groove 175 of the second support portion 173.

A first slider 126 protruded from the outer portion of the frame 120 can be slidably coupled to the first guide 172. Also, a second slider 125 that can protrude from the outer portion of the frame 120 can be slidably coupled to the second guide 174.

Accordingly, when the frame 120 receives driving force working in a Y-axis direction, the first slider 126 of the frame 120 can slide along the first guide 172, thereby moving the entire frame 120 in the Y-axis direction.

Also, when the frame 120 receives driving force working in an X-axis direction, the second slider 125 of the frame 120 can slide along the second guide 174, thereby moving the entire frame 120 in the X-axis direction.

A through hole 142 corresponding to the optical element 110 can be formed in the base unit 140, and an imaging device 190 can be disposed in the through hole 142. The imaging device 190 may be a photoelectric conversion element, such as a charge coupled device (CCD) or a complementary metal oxide semiconductor (CMOS), that can convert incident image light into an electrical signal.

The cover unit 150 can be disposed to cover the magnets 131 and 132. The cover unit 150 can be coupled to a wall portion 149 on a boundary of the base unit 140 and can be coupled around the frame 120 to cover the magnets 131 and 132.

A plurality of screw grooves 147 can be formed in the wall portion 149, and holes 157 can be formed in the cover unit 150 in positions respectively corresponding to the screw grooves 147. The cover unit 150 can be coupled to the base unit 140 via a coupling unit 155 that can pass through the holes 157 and can be screw-coupled to the screw grooves 147. A screw surface 155a can be formed on an outer portion of the coupling unit 155. A distance between the cover unit 150 and the base unit 140 may be adjusted by adjusting a depth at which the coupling unit 155 is screw-coupled to the screw groove 147 of the base unit 140.

Groove portions 151 can be respectively formed in the cover unit 150 in positions corresponding to the magnets 131 and 132. In the groove portions 151, the magnetic force generating units 161 and 162 can be respectively inserted. When an electrical signal is applied from the outside, the magnetic force generating units 161 and 162 may generate magnetic force. Although not shown in FIG. 4, the magnetic force generating units 161 and 162 may be formed of fine pattern coils.

The magnetic force generating units 161 and 162 can correspond to the magnets 131 and 132, respectively, and can generate magnetic force to generate driving force for moving the frame 120.

The magnetic force generating unit 162 can generate magnetic force so as to move the frame 120 in the X-axis direction, and the magnetic force generating unit 161 can generate magnetic force so as to move the frame 120 in the Y-axis direction.

Figure 5:
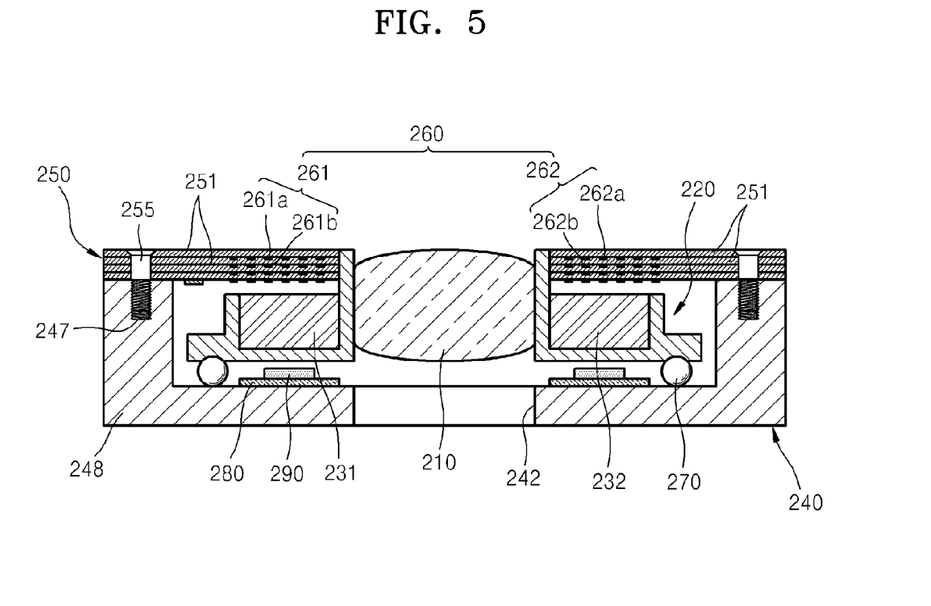
FIG. 5 is a lateral sectional view illustrating an optical device according to another embodiment.
Figure 6:
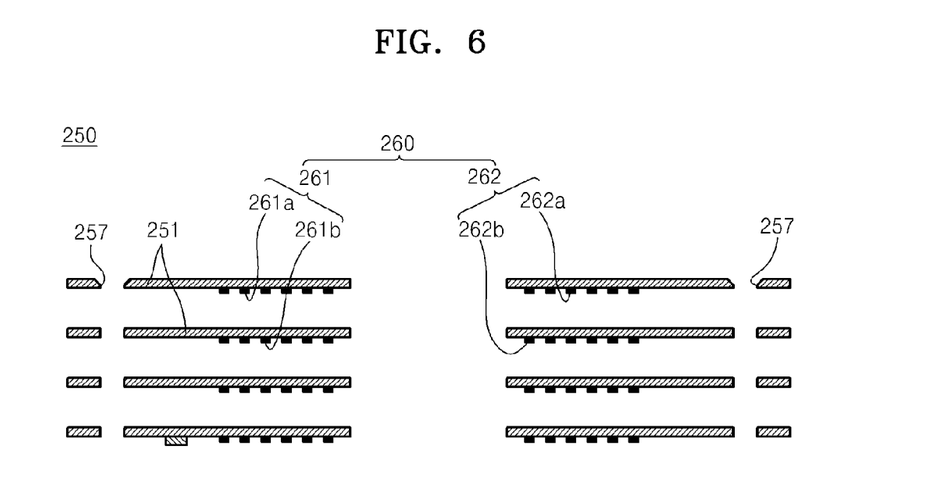
FIG. 6 is a disassembled sectional view illustrating a cover unit of the optical device of FIG. 5, according to an embodiment.

FIG. 5 is a lateral sectional view illustrating an optical device according to another embodiment, and FIG. 6 is a disassembled sectional view illustrating a cover unit 250 of the optical device of FIG. 5, according to an embodiment.

The optical device illustrated in FIGS. 5 and 6 can include an optical element 210 through which light is transmitted, a frame 220 that can support the optical element 210 and can include magnets 231 and 232, a base unit 240 that can movably support the frame 220, a cover unit 250 that can be disposed to cover the magnets 231 and 232, and a magnetic force generating unit 260 that can include magnetic force generating units 261 and 262 that can be disposed in the cover unit 250 and that can generate magnetic force.

A through hole 242 corresponding to the optical element 210 can be formed in the base unit 240. The frame 220 can be movably mounted on the base unit 240 via the ball bearings 270. In the base unit 240, an iron plate 280 can be disposed at a position corresponding to the magnets 231 and 232. Attraction can act between the iron plates 280 and the magnets 231 and 232, and thus if magnetic force is not generated by the magnetic force generating unit 260, the frame 220 may return to an original position.

Also, a sensor 290 that can sense the magnets 231 and 232 can be disposed on the base unit 240.

The cover unit 250 can be disposed to cover the magnets 231 and 232. The cover unit 250 can be coupled to a wall portion 248 that can protrude from the base unit 240 and can protrude around the frame 220 to thereby cover the magnets 231 and 232. A plurality of screw grooves 247 can be formed in the wall portion 248, and the cover unit 250 can be coupled to the base unit 240 via a coupling unit 255 that can be screw-coupled to the screw grooves 247.

Referring to FIG. 6, the cover unit 250 can include a plurality of stacked insulating layer 251. The magnetic force generating unit 260 can include a plurality of conductive layers 261a, 261b, 262a, and 262b respectively disposed on surfaces of the insulating layers 251 so as to correspond to the magnets 231 and 232 of FIG. 5. That is, the conductive layers 261a and 261b on a left portion of FIG. 6 can correspond to the magnet 231 on the left portion of FIG. 5, and the conductive layers 262a and 262b on a right portion of FIG. 6 can correspond to the magnet 232 on the right portion of FIG. 5.

The plurality of insulating layers 251 can each include a hole 257 through which the coupling unit 255 of FIG. 5 can pass through. The conductive layers 261a, 261b, 262a, and 262b can form conductive patterns, thereby functioning as a coil that can generate a magnetic force when a current is applied to the coil from the outside.

Unlike the embodiments illustrated in FIGS. 1 through 4, the whole cover unit 250 of FIGS. 5 and 6 can be formed of fine pattern coils. Thus, there may be no need to separately assemble the magnetic force generating unit 260 in the cover unit 250, and the thickness of the cover unit 250 may be minimized to reduce the total thickness of the optical device.

According to the optical devices of the embodiments, an optical element may be moved by using a compact structure, and thus a hand shake may be corrected. In addition, instrumental error that may occur when components of the optical devices are assembled may be minimized, and thus operating precision is improved.

The device described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc. Also, using the disclosure herein, programmers of ordinary skill in the art to which the invention pertains can easily implement functional programs, codes, and code segments for making and using the invention.

The particular implementations shown and described herein are illustrative examples of the invention and are not intended to otherwise limit the scope of the invention in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. It will also be recognized that the terms "comprises," "comprising," "includes," "including," "has," and "having," as used herein, are specifically intended to be read as open-ended terms of art. In addition, it should be understood that although the terms "first," "second," etc. may be used herein to describe various elements, these elements should not be limited by these terms, which are only used to distinguish one element from another. The terminology used herein is for the purpose of describing the particular embodiments and is not intended to be limiting of exemplary embodiments of the invention. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

While the invention has been particularly shown and described with reference to exemplary embodiments thereof, it will be understood by those of ordinary skill in the art that various changes in form and details may be made therein without departing from the spirit and scope of the invention as defined by the following claims. Therefore, the scope of the invention is defined not by the detailed description of the invention but by the following claims, and all differences within the scope will be construed as being included in the invention.

What is claimed is:

1. An optical device comprising:
   an optical element through which light is transmitted;
   a frame that supports the optical element;
   a plurality of magnets disposed in the frame around the optical element;
   a base unit that movably supports the frame;
   a cover unit disposed to cover the plurality of magnets; and
   a plurality of magnetic force generating units disposed in the cover unit in positions corresponding to the plurality of magnets, and that generate magnetic force when an electrical signal is applied.

2. The optical device of claim 1, wherein at least one of the plurality of magnetic force generating units comprises a fine pattern coil formed by stacking a plurality of insulating layers, each of the plurality of insulating layers having a surface on which a conductive pattern is formed.

3. The optical device of claim 1, wherein the cover unit comprises a plurality of groove portions, and the plurality of magnetic force generating units are inserted into the plurality of groove portions.

4. The optical device of claim 1, wherein the frame is movably supported relative to the base unit by a plurality of ball bearings disposed between the frame and the base unit.

5. The optical device of claim 1, wherein the frame is slidably coupled to the base unit using a straight guide.

6. The optical device of claim 1, further comprising a plurality of iron plates in the base unit disposed in positions corresponding to the plurality of magnets.

7. The optical device of claim 1, further comprising at least one sensor that senses a position of the frame with respect to the base unit.

8. The optical device of claim 1, wherein the base unit comprises a through hole in a position corresponding to the optical element.

9. The optical device of claim 8, further comprising an imaging device that is coupled to the base unit, that is located in the through hole, and that converts light transmitted through the optical element into an electrical signal.

10. The optical device of claim 1, wherein the cover unit is coupled to the base unit using at least one coupling unit, and the base unit comprises a screw groove to which the coupling unit is screw-coupled, and a distance between the cover unit and the base unit is adjusted by adjusting the screw-coupling of the at least one coupling unit and the screw groove.

11. The optical device of claim 1, wherein the cover unit comprises a plurality of insulating layers, and the plurality of magnetic force generating units comprise a plurality of conductive layers, each of the plurality of conductive layers disposed on a surface of each of the plurality of insulating layers so as to correspond to the plurality of magnets.

* * * * *